United States Patent
Kajiwara

(10) Patent No.: US 7,031,536 B2
(45) Date of Patent: Apr. 18, 2006

(54) SIGNAL PROCESSING APPARATUS AND METHOD, PROGRAM, AND STORAGE MEDIUM

(75) Inventor: Hiroshi Kajiwara, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 739 days.

(21) Appl. No.: 10/255,699

(22) Filed: Sep. 27, 2002

(65) Prior Publication Data

US 2003/0063811 A1 Apr. 3, 2003

(30) Foreign Application Priority Data

Sep. 28, 2001 (JP) ............................. 2001/301218
Aug. 7, 2002 (JP) ............................. 2002/230327

(51) Int. Cl.
*G06K 9/46* (2006.01)

(52) U.S. Cl. ..................................... 382/240

(58) Field of Classification Search ................ 382/232, 382/233, 238, 239, 240, 246, 260, 302, 305; 375/240.1, 240.11, 240.19, 240.21; 341/50, 341/51, 79; 708/300
See application file for complete search history.

(56) References Cited

U.S. PATENT DOCUMENTS

| | | | | |
|---|---|---|---|---|
| 5,945,930 | A | 8/1999 | Kajiwara | 341/50 |
| 6,028,963 | A | 2/2000 | Kajiwara | 382/239 |
| 6,031,938 | A | 2/2000 | Kajiwara | 382/329 |
| 6,067,383 | A * | 5/2000 | Taniguchi et al. | 382/240 |
| 6,101,282 | A | 8/2000 | Hirabayashi et al. | 382/246 |
| 6,233,355 | B1 | 5/2001 | Kajiwara | 382/238 |
| 6,310,980 | B1 | 10/2001 | Kajiwara | 382/238 |
| 6,501,859 | B1 | 12/2002 | Kajiwara | 382/239 |
| 6,523,051 | B1 * | 2/2003 | Majani et al. | 708/300 |
| 6,549,676 | B1 * | 4/2003 | Nakayama et al. | 382/246 |
| 6,560,365 | B1 * | 5/2003 | Nakayama et al. | 382/233 |
| 6,665,444 | B1 * | 12/2003 | Kajiwara | 382/240 |
| 6,678,422 | B1 * | 1/2004 | Sharma et al. | 382/240 |
| 6,711,295 | B1 * | 3/2004 | Nakayama et al. | 382/232 |
| 6,763,139 | B1 * | 7/2004 | Andrew | 382/240 |
| 6,768,819 | B1 * | 7/2004 | Yamazaki et al. | 382/240 |
| 6,847,736 | B1 * | 1/2005 | Itokawa | 382/240 |
| 6,873,738 | B1 * | 3/2005 | Kondo | 382/240 |
| 6,879,726 | B1 * | 4/2005 | Sato et al. | 382/239 |
| 6,879,727 | B1 * | 4/2005 | Sato et al. | 382/239 |
| 6,888,970 | B1 * | 5/2005 | Sandford | 382/302 |
| 6,917,717 | B1 * | 7/2005 | Simard et al. | 382/240 |
| 6,947,600 | B1 * | 9/2005 | Sato et al. | 382/233 |
| 2002/0061140 | A1 * | 5/2002 | Kajiwara | 382/233 |
| 2003/0007561 | A1 * | 1/2003 | Kajiwara | 375/240.11 |

* cited by examiner

*Primary Examiner*—Andrew W. Johns
*Assistant Examiner*—Amir Alavi
(74) *Attorney, Agent, or Firm*—Fitzpatrick, Cella, Harper & Scinto

(57) ABSTRACT

A signal storage processor (101) stores signals input from a signal input unit (100) in a buffer (102) for respective lines. A vertical discrete wavelet transformer (103) reads out an index value L from the signal storage processor (101), and obtains a reference address B from the value L. If L=2, B=2. If L=4, B=0. Furthermore, the vertical discrete wavelet transformer (103) reads out the i-th column of sets of data, which are stored in the buffer (102) and are continuous in the vertical direction (i.e., data read out from four addresses (addresses in the buffer (102)) ix4+B, ix4+mod((B+1),4), ix4+mod((B+2),4), and ix4+mod((B+3),4)), and computes the one-dimensional discrete wavelet transforms of the readout data.

26 Claims, 14 Drawing Sheets

SIGNAL PROCESSING APPARATUS AND METHOD, PROGRAM, AND STORAGE MEDIUM

FIELD OF THE INVENTION

The present invention relates to a signal processing apparatus and method, a program, and a storage medium.

BACKGROUND OF THE INVENTION

In recent years, discrete wavelet transformation has received a lot of attention in various fields of image processes such as analysis, compression, and recognition of digital signals. Especially, in the image compression field, since a signal entropy reduction effect of the discrete wavelet transformation is high, and a subband decomposition process is suitable for scalable transmission of an image, image compression methods using the discrete wavelet transformation have been extensively examined. It is already determined that a new still image encoding scheme JPEG2000, which will be recommended soon as international standards ITU-T T.800|ISO/IEC 15444, would adopt discrete wavelet transformation.

Conventionally, it is difficult to implement the discrete wavelet transformation of an image due to its memory cost problems, complexity in calculations, and the like. However, simple implementation using a lifting scheme has been examined since I. Daubechies, W. Swelden, et al. have proposed that all discrete wavelet transforms can be decomposed into simple filter lifting steps.

As an example of discrete wavelet transformation, the discrete wavelet transforms of a one-dimensional digital signal sequence x(n) are computed using a 5×3 filter by:

$$r(n) = -x(2n-2)/8 + x(2n-1)/4 + \quad (1)$$
$$3 \times (2n)/4 + x(2n+1)/4 - x(2n+2)/8$$

$$d(n) = -x(2n)/2 + x(2n+1) - x(2n+2)/2 \quad (2)$$

When this 5×3 filter is formed based on the lifting scheme, equations (1) and (2) are respectively modified as:

$$r(n) = x(2n) + (d(n-1) + d(n))/4 \quad (3)$$

$$d(n) = x(2n+1) - (x(2n) + x(2n+2))/2 \quad (4)$$

As can be seen from equations (3) and (4), the number of times of arithmetic operations and the number of times of required data access can be reduced compared to equations (1) and (2).

When a two-dimensional (2D) signal sequence such as an image signal or the like undergoes discrete wavelet transformation, the aforementioned transformation process for the one-dimensional signals is applied in the horizontal and vertical directions. Most of image signals are exchanged in the raster scan order. In such case, image signals or intermediate values of arithmetic operations must be stored for a required number of lines in order to implement transformation in the vertical direction.

FIG. 3 is a block diagram of an apparatus (signal processing apparatus) which implements 2D discrete wavelet transformation using the 5×3 filter by the conventional method. Referring to FIG. 3, reference numeral 300 denotes a signal input unit for inputting image signals; 301, a signal storage processor for controlling storage of the input image signals in a buffer 302 for respective lines; 302, a buffer for storing the image signals for respective lines; 303, a vertical discrete wavelet transformer for computing the discrete wavelet transforms of image signals for a plurality of lines stored in the buffer 302 in the vertical direction; 304, a start address storage unit for storing the start addresses of respective lines stored in the buffer 302; 305, a horizontal discrete wavelet transformer for computing the discrete wavelet transforms of transform coefficients of an L subband obtained by the vertical discrete wavelet transformer in the horizontal direction; and 306, a horizontal discrete wavelet transformer for computing the discrete wavelet transforms of transform coefficients of an H subband obtained by the vertical discrete wavelet transformer in the horizontal direction.

Assume that the signal processing apparatus shown in FIG. 3 computes the transforms of 2D signals which have X samples in the horizontal direction, and Y samples in the horizontal direction, and in which each sample is expressed by 8 bits. The discrete wavelet transformation apparatus in FIG. 3 computes the discrete wavelet transforms of 2D signals for one stage to generate coefficients of four subbands LL, LH, HL, and HH. It is a common practice to further decompose the LL subband into subbands. In such case, a method of preparing a plurality of apparatuses with the arrangement shown in FIG. 3, and operating them in series, or selectively using a single apparatus by switching input data is adopted.

In consideration of a case wherein the apparatuses are connected in series upon operation, Sx represents the number of samples in the horizontal direction of signals input to each apparatus. For example, when two apparatuses operate in series, the number Sx of samples in the horizontal direction of signals input to the first apparatus is X, and the number Sx of samples in the horizontal direction of signals input to the second apparatus is floor{(X+1)/2}. Note that floor{R} is a function of obtaining a maximum integer smaller than real number R. The buffer 302 in FIG. 3 stores signals and intermediate values of arithmetic operations for a plurality of lines, which are required to implement the 5×3 filter. In case of implementation without any lifting, five lines in the vertical direction are required to obtain five signals x(2n−2) to x(2n+2) (five signals in the vertical direction), as can be seen from equations (1) and (2). On the other hand, if the lifting scheme is used, arithmetic operations given by equations (3) and (4) can be expressed, as shown in FIG. 2, and r(n) and d(n) can be obtained if x(2n), x(2n+1), x(2n+2), and d(n−1) in FIG. 2 are available.

Therefore, the buffer must store data for four lines, i.e., signals for three lines (corresponding to x(2n) to x(2n+2)) and an intermediate value for one line (corresponding to d(n−1)). A case will be exemplified wherein lifting is used. Hence, as the buffer 302, the capacity that can store data for four lines, i.e., a memory with a capacity of 4×Sx is prepared. FIG. 11 shows an example of the configuration of the buffer 302.

The start address storage unit 304 stores the start addresses AD[L] (L=0 to 3) of respective lines for the data for four lines, which are stored in the buffer 302. The start addresses of respective lines are replaced as needed during the transformation process. In an initial state, AD[0], AD[1], AD[2], and AD[3] are respectively 0, Sx, 2×Sx, and 3×Sx (see FIG. 11). The operation of the conventional 2D discrete wavelet transformation apparatus will be described below using FIG. 3.

2D signals to be transformed are input from the signal input unit 300 in the raster scan order. Upon computing the discrete wavelet transforms, it is a common practice to extend signals by reflecting them at their two ends in the horizontal and vertical directions. However, in this case, assume that such signal extension processes are executed outside the apparatus and are not taken into consideration, for the sake of simplicity. In this case, wasteful coefficients are output around coefficients of subbands to be generated (two ends in the horizontal and vertical directions), but only effective coefficients are selected.

The signal storage processor 301 stores the signals input from the signal input unit 300 in the raster scan order in the buffer 302 for respective lines. The signal storage processor 301 internally holds an index value L used to acquire the start address of each line upon storing the received line data. FIG. 4 shows the flow of processes of the signal storage processor 301. Referring to FIG. 4, step S401 is the step of initializing index L to 1, step S402 is the step of acquiring the start address AD[L] of line data in the buffer 302, step S403 is the step of storing line data in the buffer 302, step S404 is the step of updating index L, steps S405, S406, S407, and S408 are the steps of instructing the vertical discrete wavelet transformer 303 to compute the discrete wavelet transforms in the vertical direction if index L is 2, or updating index L in other cases, and step S409 is the step of checking if the line of interest is the last line.

At the beginning of the transformation process, index L is initialized to 1 (step S401). The start address AD[L] upon storing line data is acquired from the start address storage unit 304 (step S402). Signals for one line input from the signal input unit 300 are stored in turn from the address AD[L] of the buffer 302 (step S403). Upon completion of storage of signals for one line, index L is incremented by 1 to update the index (step S404). If index L=4, index L is re-set to 2 (steps S405 and S406). It is then checked if index L=2 (step S407). If L=2, the processor 301 instructs the vertical discrete wavelet transformer 303 to compute the discrete wavelet transforms in the vertical direction (step S408). It is then checked if the stored signals for one line correspond to the last line of the two-dimensional signals to be transformed (step S409). If NO in step S409, the process is repeated from step S402; otherwise, the process ends.

After required data are stored in the buffer 302, the vertical discrete wavelet transformer 303 computes the discrete wavelet transforms in the vertical direction to generate coefficients of low- and high-frequency components for one line, and outputs the coefficients of low-frequency components onto a signal line 307, and those of high-frequency components onto a signal line 308. Required data are stored in the buffer 302 at a timing when the index value L of the signal storage processor 301 is set to be 2.

FIG. 5 shows the flow of transformation processes for generating low- and high-frequency components for one line by the vertical discrete wavelet transformer 303. Referring to FIG. 5, step S501 is the step of acquiring start addresses AD[0] to AD[3] of respective lines, step S502 is the step of substituting zero in variable i, step S503 is the step of executing a vertical discrete wavelet transformation process for one set of data to generate a coefficient of one low-frequency component and that of one high-frequency component, step S504 is the step of incrementing variable i by 1, step S505 is the step of comparing variable i with the number Sx of samples in the horizontal direction, and step S506 is the step of updating the start addresses of respective lines. The processing flow of the vertical discrete wavelet transformer 303 will be explained below using FIG. 5.

In step S501, AD[0], AD[1], AD[2], and AD[3] are read out from the start address storage unit 304. In step S502, zero is substituted in variable i. In step S503, the i-th column of sets of data which are continuous in the vertical direction is read out. The i-th column of sets of data which are continuous in the vertical direction is a data sequence read out from four addresses AD[0]+i, AD[1]+i, AD[2]+i, and AD[3]+i, and data read out from these addresses respectively correspond to d(n−1), x(2n), x(2n+1), and x(2n+2) in one-dimensional discrete wavelet transformation formulas given by equations (3) and (4). Furthermore, in step S503, a low-frequency component r[n] and high-frequency component d[n] are calculated based on equations (3) and (4), a coefficient r[n] of the low-frequency component is output onto the signal line 307, and a coefficient d[n] of the high-frequency component is output onto a signal line 308. At this time, the obtained high-frequency component d[n] is stored at the address where x(2n+1) is stored (i.e., AD[2]+i).

In step S504, i is updated by adding 1 to it. In step S505, i and Sx are compared. If i<Sx, the flow returns to step S503. Upon completion of the vertical discrete wavelet transformation processes in step S503 from i=0 to Sx−1, values stored in AD[0] and AD[1] are exchanged, and values stored in AD[2] and AD[3] are exchanged, and those values are stored in the start address storage unit 304 in step S506.

The horizontal discrete wavelet transformers 305 and 306 execute transformation processes based on equations (3) and (4) for data for one line (coefficients of low- or high-frequency component) respectively input from the signal lines 307 and 308, and generate and output coefficients of low- and high-frequency components.

The aforementioned processes are repeated for all lines input from the signal input unit 300, thus computing the 2D discrete wavelet transforms.

As described above, when 2D signals such as image data or the like are decomposed into subbands, a plurality of data which are continuous in the vertical direction are read out and processed in the vertical transformation. However, when the number of pixels in the horizontal direction of an image such as high-resolution image data or the like is extremely large, data which are continuous in the vertical direction are stored in a memory at discrete positions. For example, when a computer system, which comprises a cache memory that can read/write data at high speed between a central processing unit and main memory, implements discrete wavelet transformation of image data by software, the cache hit rate is high and the time required to read out data can be short since data are continuously read out from the memory upon horizontal transformation. However, upon reading out data required for vertical transformation, the hit rate of the cache memory lowers, resulting in a long conversion process.

The present invention has been made in consideration of the aforementioned problems, and has as its object to implement high-speed wavelet transformation process by reducing the time required to read out data to be accessed in wavelet transformation.

SUMMARY OF THE INVENTION

In order to achieve the object of the present invention, for example, an signal processing apparatus of the present invention has the following arrangement.

There is provided a signal processing apparatus comprises:

storage control means for controlling to store image signals for a predetermined number of lines in predetermined storage means, and counting an index value for each line upon storing an image signal for each line in the storage means;

first wavelet transformation means for specifying addresses in the storage means of data at identical positions in respective lines stored in the storage means using the index value in response to a timing at which the index value reaches a predetermined value, and reading out data stored at the specified addresses, and applying a wavelet transforms to the data in a first direction; and second wavelet transformation means for applying a wavelet transforms to coefficients obtained by the first wavelet transformation means in a second direction.

In order to achieve the object of the present invention, for example, an signal processing method of the present invention has the following arrangement.

There is provided a signal processing method comprising:

a storage control step of controlling to store image signals for a predetermined number of lines in predetermined storage means, and counting an index value for each line upon storing an image signal for each line in the storage means;

a first wavelet transformation step of specifying addresses in the storage means of data at identical positions in respective lines stored in the storage means using the index value in response to a timing at which the index value reaches a predetermined value, and reading out data stored at the specified addresses, and applying a wavelet transforms to the data in a first direction; and a second wavelet transformation step of applying a wavelet transforms to coefficients obtained in the first wavelet transformation step in a second direction.

In order to achieve the object of the present invention, for example, an signal processing apparatus of the present invention has the following arrangement.

There is provided a signal processing apparatus for decomposing two-dimensional signals into frequency bands, comprising:

signal input means for inputting two-dimensional signals to be transformed;

first wavelet transformation means for applying a wavelet transforms to the two-dimensional signals input by the signal input means in a first direction to generate coefficients of low- and high-frequency bands;

second wavelet transformation means for applying a wavelet transforms to the coefficients generated by the first wavelet transformation means in a second direction different from the first direction; and signal storage means for storing two-dimensional signals, or two-dimensional signals and intermediate signals, which are required in transformation in a vertical direction, for a predetermined number of lines, wherein one of the first and second wavelet transformation means reads out the signals stored in the signal storage means, and applies a wavelet transforms to the signals in the vertical direction, and the signal storage means independently assigns a memory area to each column sample used in wavelet transformation in the vertical direction.

In order to achieve the object of the present invention, for example, an signal processing method of the present invention has the following arrangement.

There is provided a signal processing method for decomposing two-dimensional signals into frequency bands, comprising:

a signal input step of inputting two-dimensional signals to be transformed;

a first wavelet transformation step of applying a wavelet transforms to the two-dimensional signals input in the signal input step in a first direction to generate coefficients of low- and high-frequency bands;

a second wavelet transformation step of applying a wavelet transforms to the coefficients generated in the first wavelet transformation step in a second direction different from the first direction; and a signal storage step of storing two-dimensional signals, or two-dimensional signals and intermediate signals, which are required in transformation in a vertical direction, for a predetermined number of lines, wherein the signals stored in the signal storage step are read out in one of the first and second wavelet transformation steps, and applied a wavelet transforms in the vertical direction, and the signal storage step includes a step of independently assigning a memory area to each column sample used in wavelet transformation in the vertical direction.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings.

First Embodiment

Figure 1:
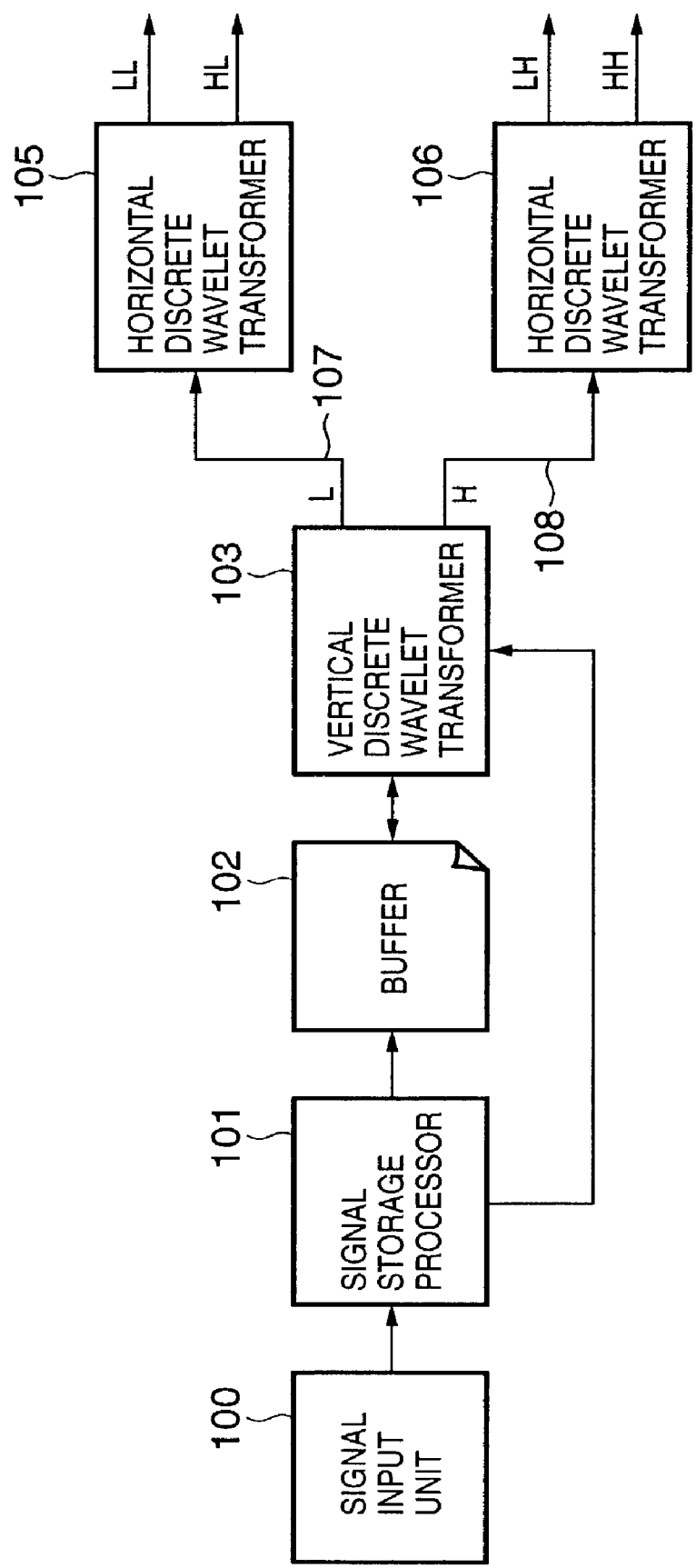
FIG. 1 is a block diagram showing the basic arrangement of a signal processing apparatus according to the first embodiment of the present invention.
Figure 2:
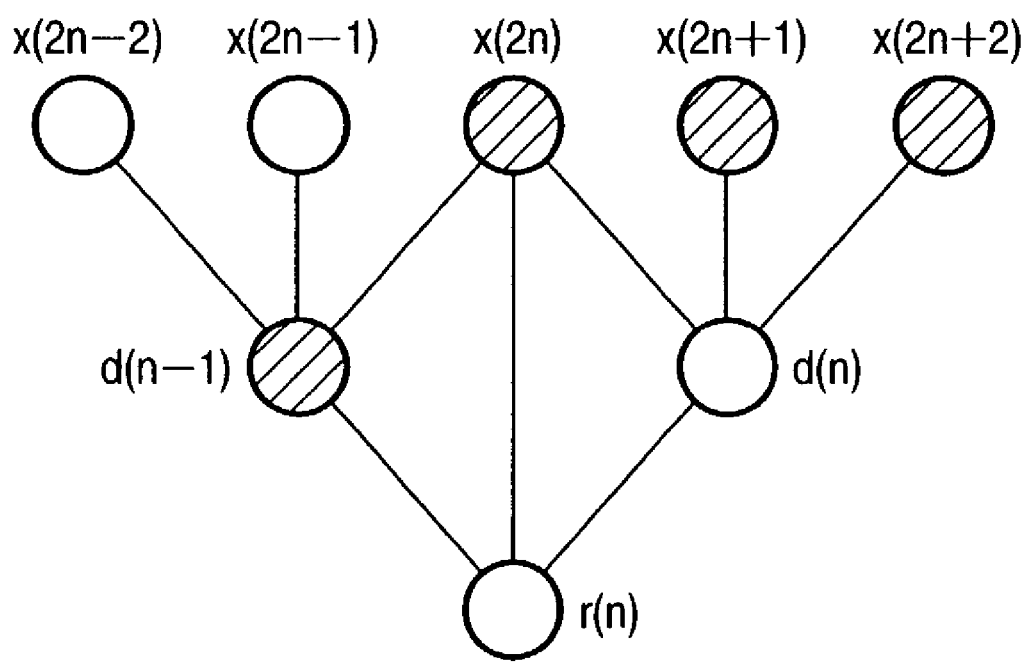
FIG. 2 is a view for explaining a lifting scheme.
Figure 3:
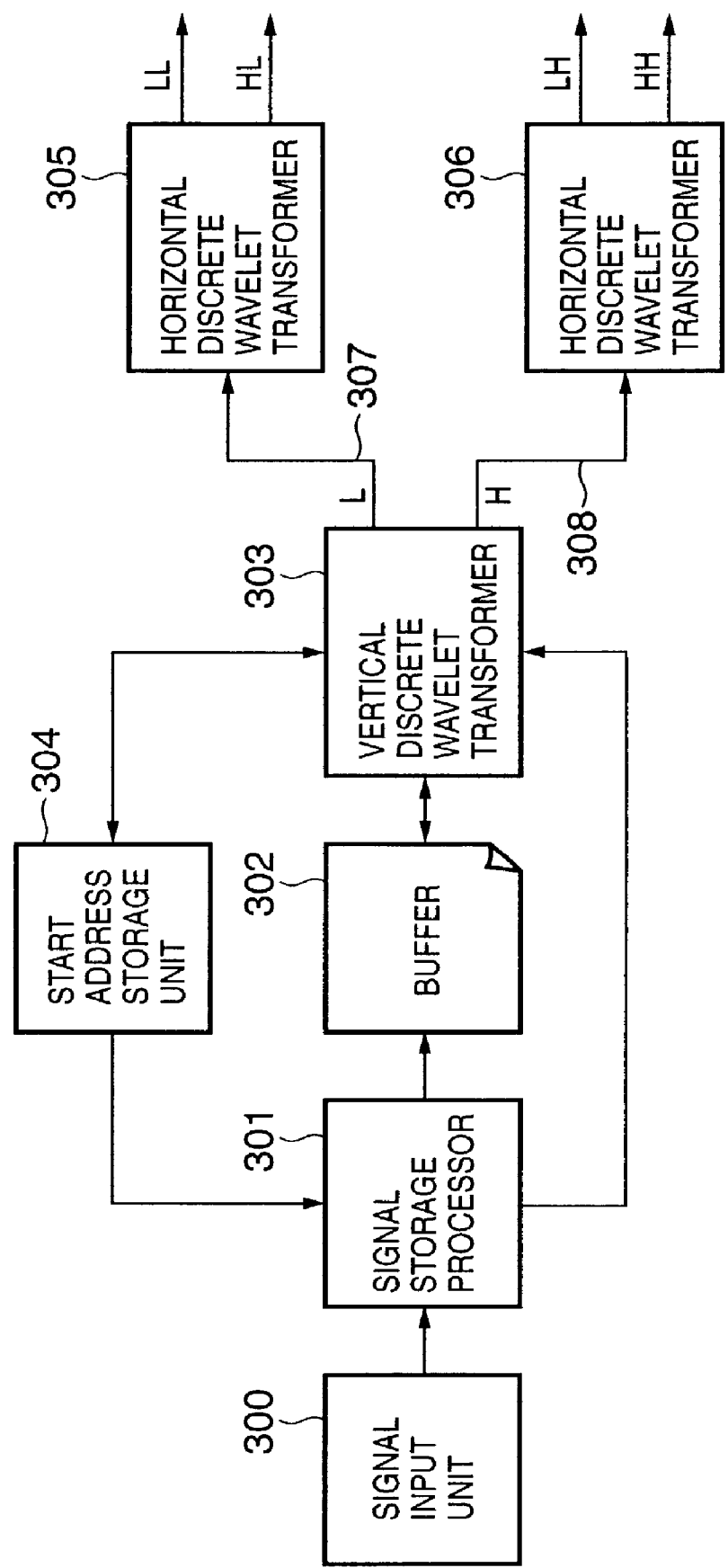
FIG. 3 is a block diagram of an apparatus (signal processing apparatus) that implements 2D discrete wavelet transformation using a 5×3 filter by the conventional method.

FIG. 1 is a block diagram showing the basic arrangement of a signal processing apparatus of this embodiment. Referring to FIG. 1, reference numeral 100 denotes a signal input unit; 101, a signal storage processor; 102, a buffer; 103, a vertical discrete wavelet transformer; 105 and 106, horizontal discrete wavelet transformers; and 107 and 108, signal lines.

Figure 11:
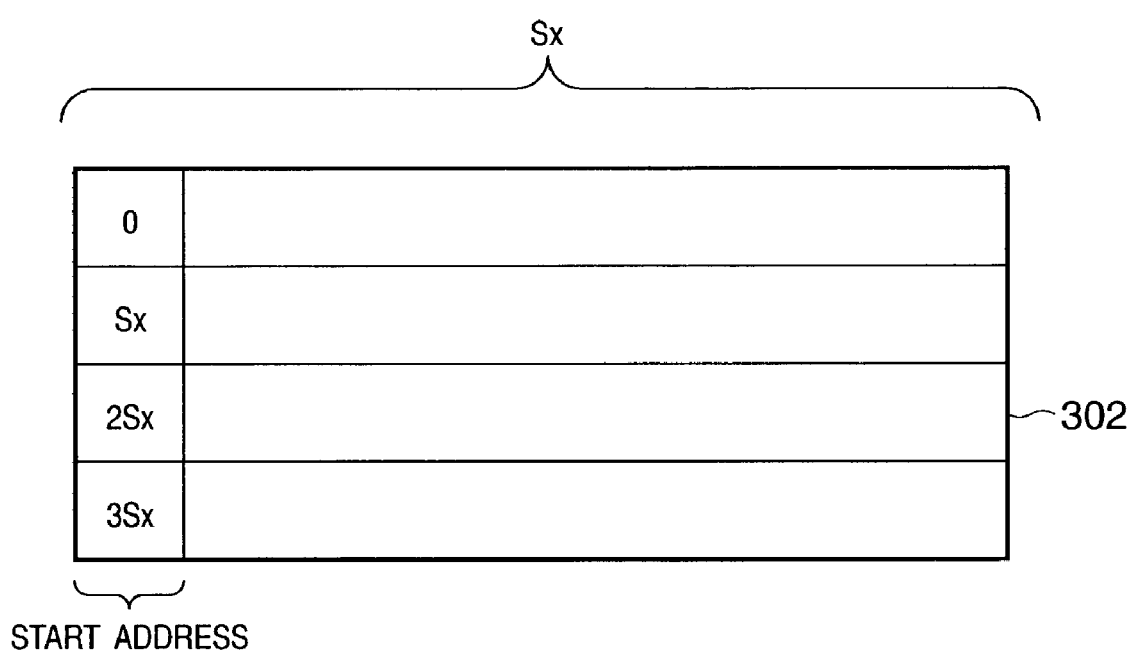
FIG. 11 shows an example of the configuration of a buffer 302.

Assume that the signal processing apparatus of this embodiment computes the transforms of 2D signals which have X samples in the horizontal direction, and Y samples in the horizontal direction, and in which each sample is expressed by 8 bits, as in the conventional method described above. Also, Sx represents the number of samples in the horizontal direction of signals input to the apparatus of this embodiment. The buffer 102 stores signals and intermediate values of arithmetic operations for a plurality of lines, which are required to implement a 5×3 filter. As described above, upon implementation without lifting, signals for five lines are required. When the lifting scheme is used, signals for three lines and intermediate value for one line are required. In this embodiment, lifting is used. Therefore, as the buffer 102, a capacity that can store data for four lines (4×Sx) is prepared, as shown in FIG. 11.

The operation of the signal processing apparatus of this embodiment will be described below using FIG. 1.

Two-dimensional (2D) signals to be transformed are input from the signal input unit 100 in the raster scan order. As in the conventional method described above, assume that extension of signals by reflecting them at their two ends is done outside the apparatus and is not taken into consideration.

Figure 4:
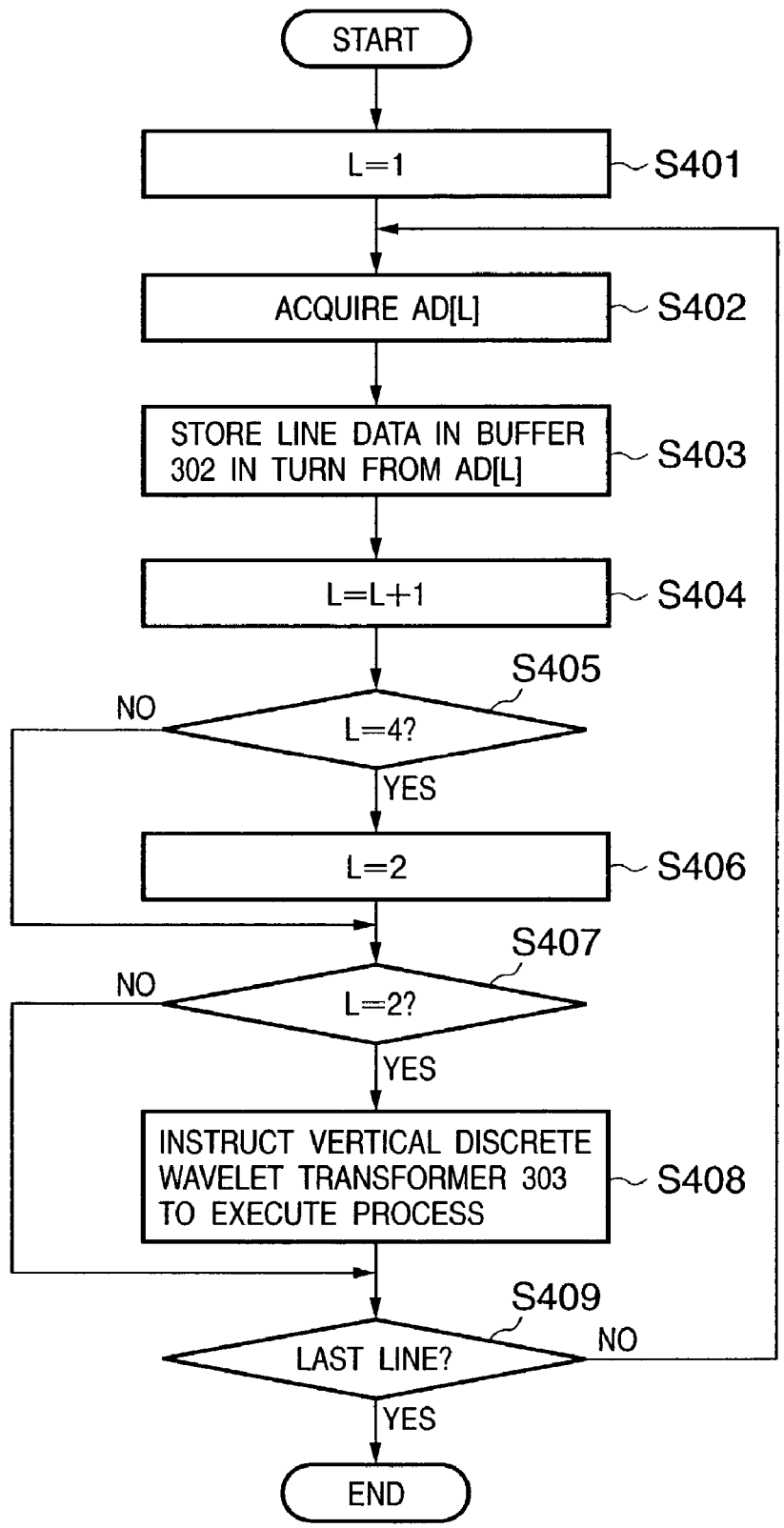
FIG. 4 is a flow chart showing the flow of processes of a signal storage processor 301.
Figure 5:
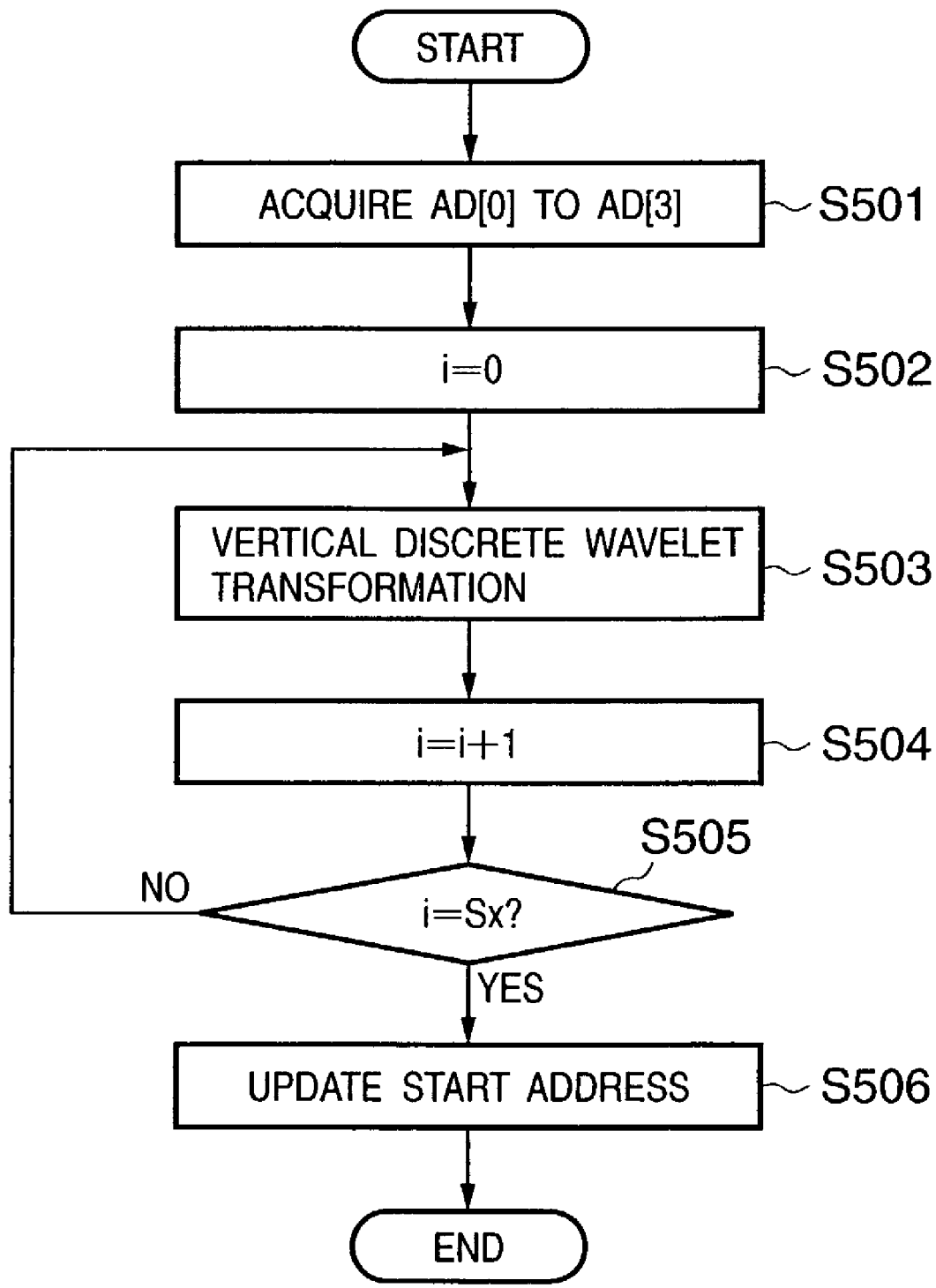
FIG. 5 is a flow chart showing the flow of processes for generating low- and high-frequency components for one line in a vertical discrete wavelet transformer 303.
Figure 12:
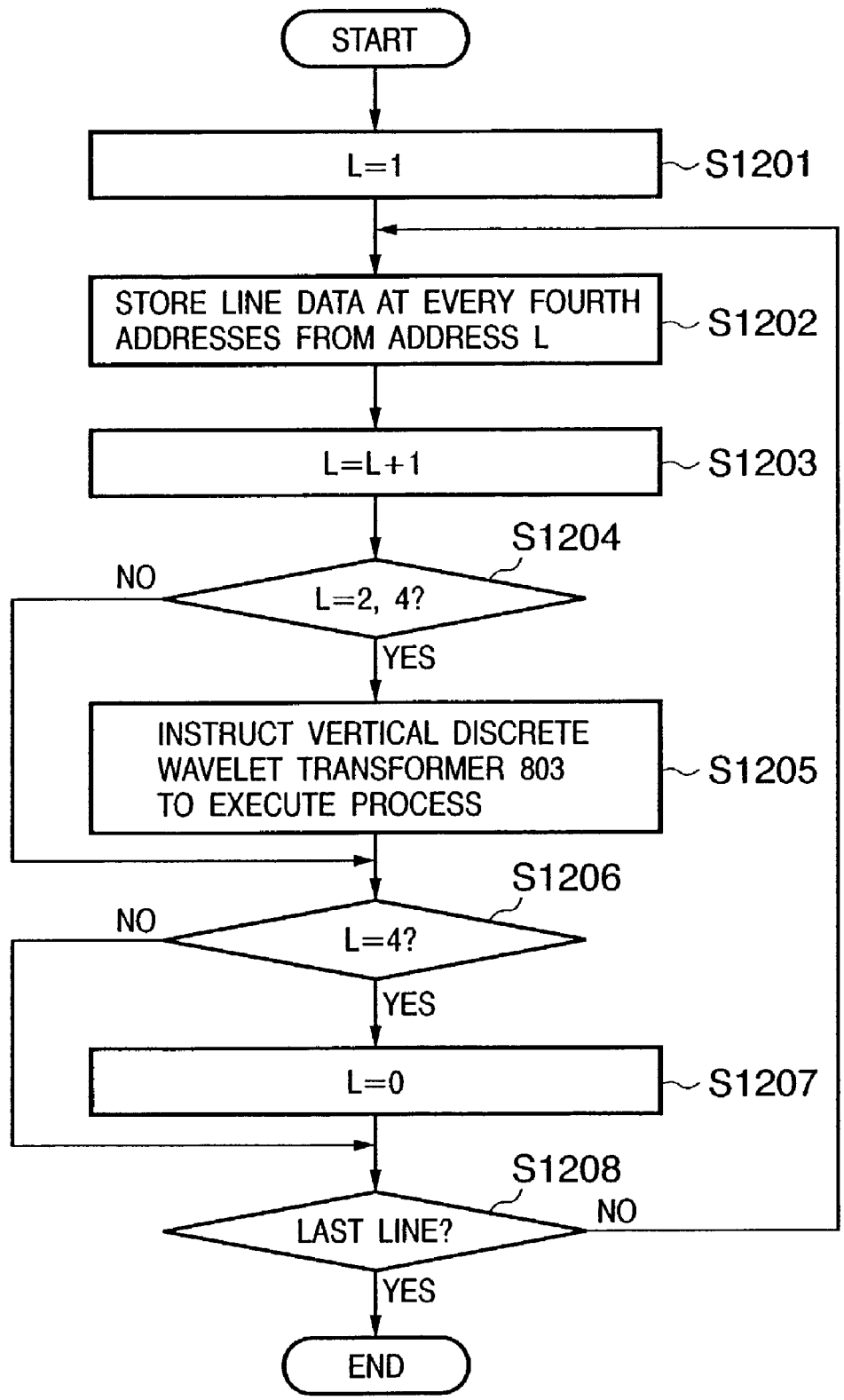
FIG. 12 is a flow chart showing the flow of processes of a signal storage processor 101.

The signal storage processor 101 stores the signals input from the signal input unit 100 in the raster scan order in the buffer 102 for respective lines. FIG. 12 shows the processes in the signal storage processor 101. Referring to FIG. 12, step S1201 is the step of initializing index L (the index value L in FIG. 4) to 1, step S1202 is the step of storing line data, step S1203 is the step of updating index L, steps S1204, S1205, S1206, and S1207 are the steps of instructing the vertical discrete wavelet transformer 103 to compute the discrete wavelet transforms in the vertical direction if index L is either 2 or 4, or re-setting index L to zero if L=4, and step S1208 is the step of checking if the line of interest is the last line.

At the beginning of the transformation process, index L is initialized to 1 (step S1201). Signals for one line, which are input from the signal input unit 100, are stored at every fourth addresses in turn from address L of the buffer 102 (step S1202). Upon completion of storage of signals for one line, index L is incremented by 1 to update the index (step S1203). If index L is either 2 or 4 (step S1204), the processor 101 instructs the vertical discrete wavelet transformer 103 to compute the discrete wavelet transforms in the vertical direction (step S1205). If index L has reached 4, it is re-set to zero (steps S1206 and S1207). It is checked if the signals for one line stored in the buffer 102 correspond to the last line of 2D signals to be transformed (step S1208). If NO in step S1208, the process is repeated from step S1202; otherwise, the process ends.

Figure 6:
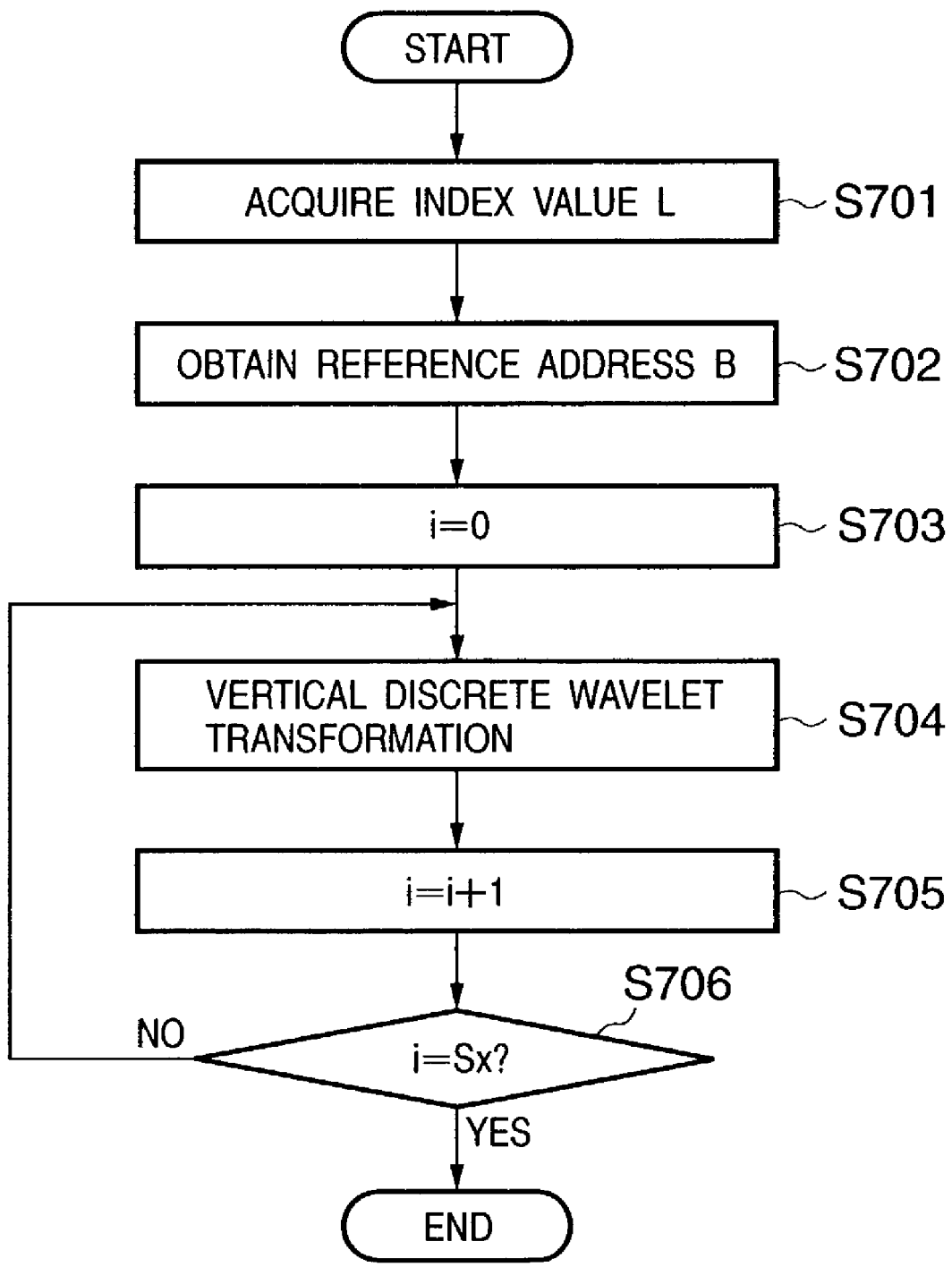
FIG. 6 is a flow chart showing the flow of transformation processes for generating low- and high-frequency components for one line in a vertical discrete wavelet transformer 103.

FIG. 6 shows the flow of transformation processes for generating low- and high-frequency components for one line in the vertical discrete wavelet transformer 103. Referring to FIG. 6, step S701 is the step of acquiring the index value L (index value L shown in FIG. 4), step S702 is the step of obtaining a reference address B from the index value L, step S703 is the step of substituting zero in variable i, step S704 is the step of executing a vertical discrete wavelet transformation process for one set of data to generate a coefficient of one low-frequency component and that of one high-frequency component, step S705 is the step of incrementing variable i by 1, and step S706 is the step of comparing variable i and the number Sx of samples in the horizontal direction.

The flow of processes in the vertical discrete wavelet transformer 103 will be explained below using FIG. 6. In step S701, the index value L is read out from the signal storage processor 101. In step S702, the reference address B is obtained from the index value L. If the index value L is 2, the reference address B is 2; if the index value L is 4, the reference address B is zero. In step S703, zero is substituted in variable i. In step S704, the i-th column of sets of data which are stored in the buffer 102 and are continuous in the vertical direction is read out. The i-th column of sets of data which are continuous in the vertical direction is a sequence of data read out from four addresses i×4+B, i×4+mod((B+1),4), i×4+mod((B+2),4), and i×4+mod((B+3),4) (addresses in the buffer 102), and the data read out from these addresses respectively correspond to $d(n-1)$, $x(2n)$, $x(2n+1)$, and $x(2n+2)$ in one-dimensional discrete wavelet transformation formulas given by equations (3) and (4). Note that $mod(a,b)$ is a function that returns the remainder obtained when a is divided by b.

Furthermore, in step S704, a low-frequency component $r[n]$ and high-frequency component $d[n]$ are calculated based on equations (3) and (4), a coefficient $r[n]$ of the low-frequency component is output onto the signal line 107, and a coefficient $d[n]$ of the high-frequency component is output onto a signal line 108. At this time, the obtained high-frequency component $d[n]$ is stored at the address where $x(2n+1)$ is stored (i.e., i×4+mod((B+2),4)). In step S705, i is updated by adding 1 to it. In step S706, i is compared with Sx. If i<Sx, the flow returns to step S704. The processes in steps S704 and S705 (the process for computing the discrete wavelet transforms of a data set of the i-th column in the vertical direction while updating i) are repeated from i=0 to Sx−1.

The horizontal discrete wavelet transformers 105 and 106 execute transformation processes based on equations (3) and (4) for data for one line (coefficients of low- or high-frequency component) respectively input from the signal lines 107 and 108, and generate and output coefficients of low- and high-frequency components.

The aforementioned processes are repeated for all lines input from the signal input unit 100, thus computing the 2D discrete wavelet transforms of 2D signals.

Second Embodiment

Figure 7:
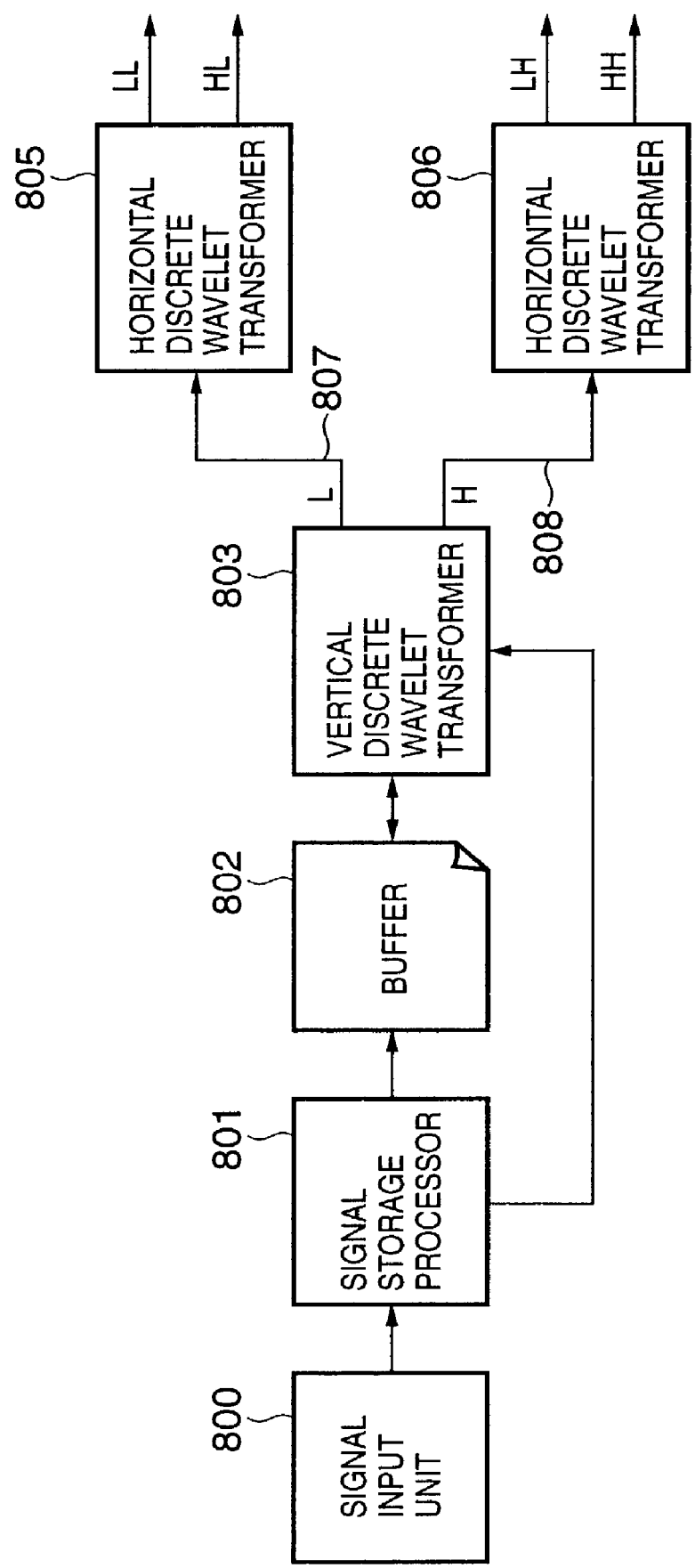
FIG. 7 is a block diagram showing the basic arrangement of a signal processing apparatus according to the second embodiment of the present invention.

FIG. 7 is a block diagram showing the basic arrangement of a signal processing apparatus of this embodiment. Referring to FIG. 7, reference numeral 800 denotes a signal input unit; 801, a signal storage processor; 802, a buffer; 803, a vertical discrete wavelet transformer; 805 and 806, horizontal discrete wavelet transformers; and 807 and 808, signal lines. This block diagram is the same as the basic arrangement of the signal processing apparatus in the first embodiment (shown in FIG. 1), but processes executed by the respective units in the signal processing apparatus of this embodiment are different from those executed by the respective units in the signal processing apparatus of the first embodiment. The processes in the respective units in the signal processing apparatus of this embodiment will be explained below.

Assume that the signal processing apparatus of this embodiment computes the transforms of 2D signals which have X samples in the horizontal direction, and Y samples in the horizontal direction, and in which each sample (pixel) is expressed by 8 bits, as in the signal processing apparatus of the first embodiment. The first embodiment uses the 5×3 filter given by equations (3) and (4) to compute the wavelet transforms. However, this embodiment uses a 9×7 filter implemented in lifting steps respectively given by:

$$d''(n)=x(2n+1)+\alpha(x(2n)+x(2n+2)) \quad (5)$$

$$r''(n)=x(2n)+\beta(d''(n-1)+d''(n)) \quad (6)$$

$$d'(n)=d''(n)+\gamma(r''(n)+r''(n+1)) \quad (7)$$

$$r'(n)=r''(n)+\delta(d'(n-1)+d'(n)) \quad (8)$$

$$d(n)=Kd'(n) \quad (9)$$

$$r(n)=r'(n)/K \quad (10)$$

where $\alpha=-1.586134$, $\beta=-0.052980$, $\gamma=0.882911$, $\delta=0.443507$, and $K=1.230174$, and $d''(n)$, $d'(n)$, $r''(n)$, and $r'(n)$ are intermediate values required to derive $d(n)$ and $r(n)$.

The buffer 802 stores signals and intermediate values of arithmetic operations for a plurality of lines, which are required to implement the 9×7 filter. According to the aforementioned lifting, since $r(n)$ and $d(n)$ can be calculated if $x(2n+2)$, $x(2n+3)$, and $x(2n+4)$ and $d''(n)$, $r''(n)$, and $d'(n)$ are available, the buffer 802 stores signals for three lines (corresponding to $x(2n+2)$ to $x(2n+4)$) and intermediate values for three lines (corresponding to $d''(n)$, $r''(n)$, and $d'(n)$) in this embodiment. Therefore, as the buffer 802, a capacity that can store data for six lines (6×Sx) is prepared.

The operation of the signal processing apparatus of this embodiment will be described below using FIG. 7.

Figure 8:
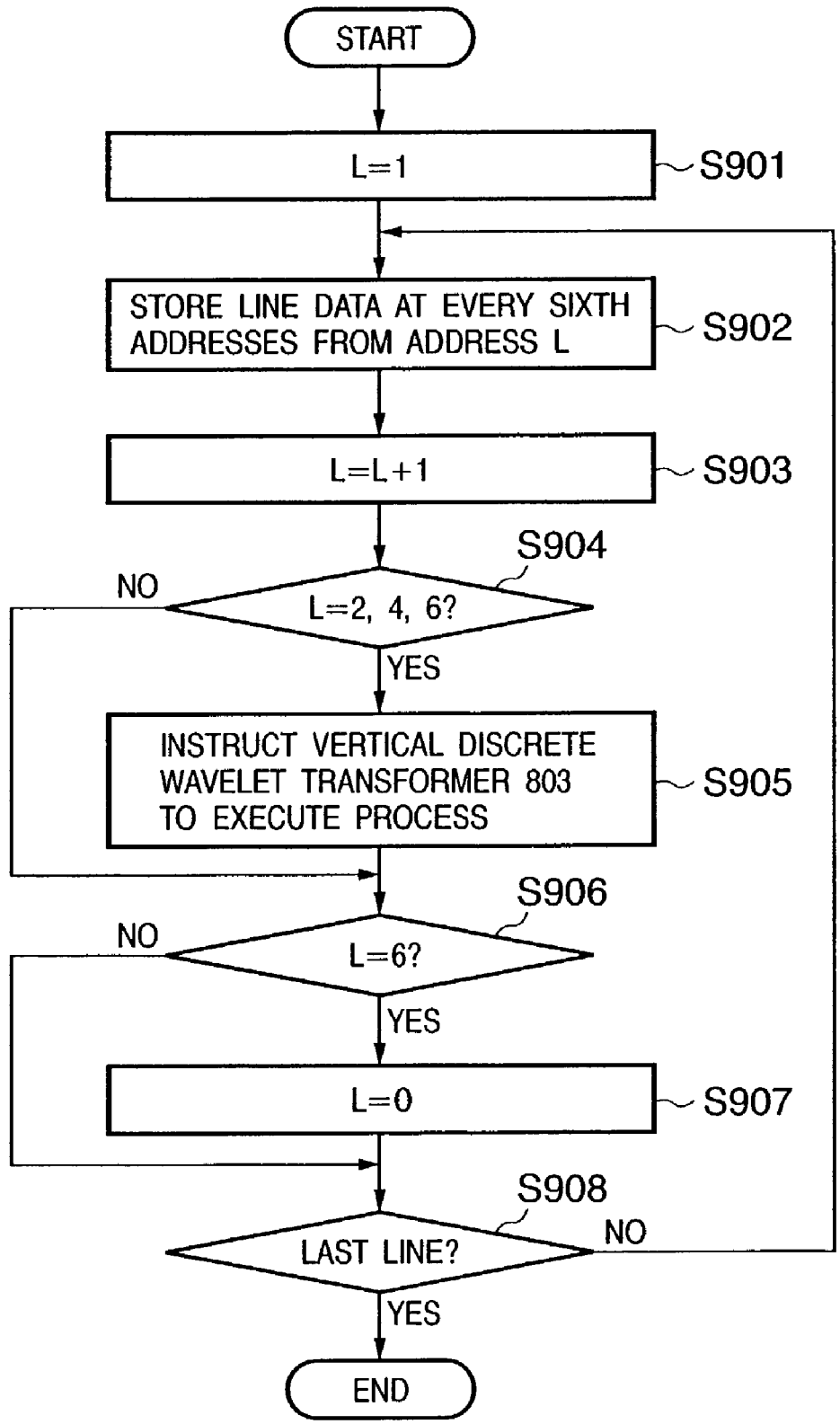
FIG. 8 is a flow chart showing the flow of processes of a signal storage processor 801.

Two-dimensional (2D) signals to be transformed are input from the signal input unit 800 in the raster scan order. The signal storage processor 801 stores the signals input from the signal input unit 800 in the raster scan order in the buffer 802 for respective lines. FIG. 8 shows the processes in the signal storage processor 801. Referring to FIG. 8, step S901 is the step of initializing index L (the index value L in FIG. 4) to 1, step S902 is the step of storing line data, step S903 is the step of updating index L, steps S904, S905, S906, and S907 are the steps of instructing the vertical discrete wavelet transformer 803 to compute the discrete wavelet transforms in the vertical direction if index L is 2, 4 or 6, or updating index L in other cases, and step S908 is the step of checking if the line of interest is the last line.

At the beginning of the transformation process, index L is initialized to 1 (step S901). Signals for one line, which are input from the signal input unit 800, are stored at every sixth addresses in turn from address L of the buffer 802 (step S902). Upon completion of storage of signals for one line, index L is incremented by 1 to update the index (step S903). If index L is 2, 4, or 6 (step S904), the processor 801 instructs the vertical discrete wavelet transformer 803 to compute the discrete wavelet transforms in the vertical direction (step S905). If index L has reached 6, it is re-set to zero (steps S906 and S907). It is checked if the signals for one line stored in the buffer 802 correspond to the last line of 2D signals to be transformed (step S908). If NO in step S908, the process is repeated from step S902; otherwise, the process ends.

After required data are stored in the buffer 802, the vertical discrete wavelet transformer 1001 computes the discrete wavelet transforms in the vertical direction to generate coefficients of low- and high-frequency components for one line, and outputs the coefficients of low-frequency components onto the signal line 807, and those of high-frequency components onto the signal line 808. Required data are stored in the buffer 802 at a timing when the index value L held by the signal storage processor 801 is updated to an even value, i.e., L is one of 2, 4, and 6.

Figure 9:
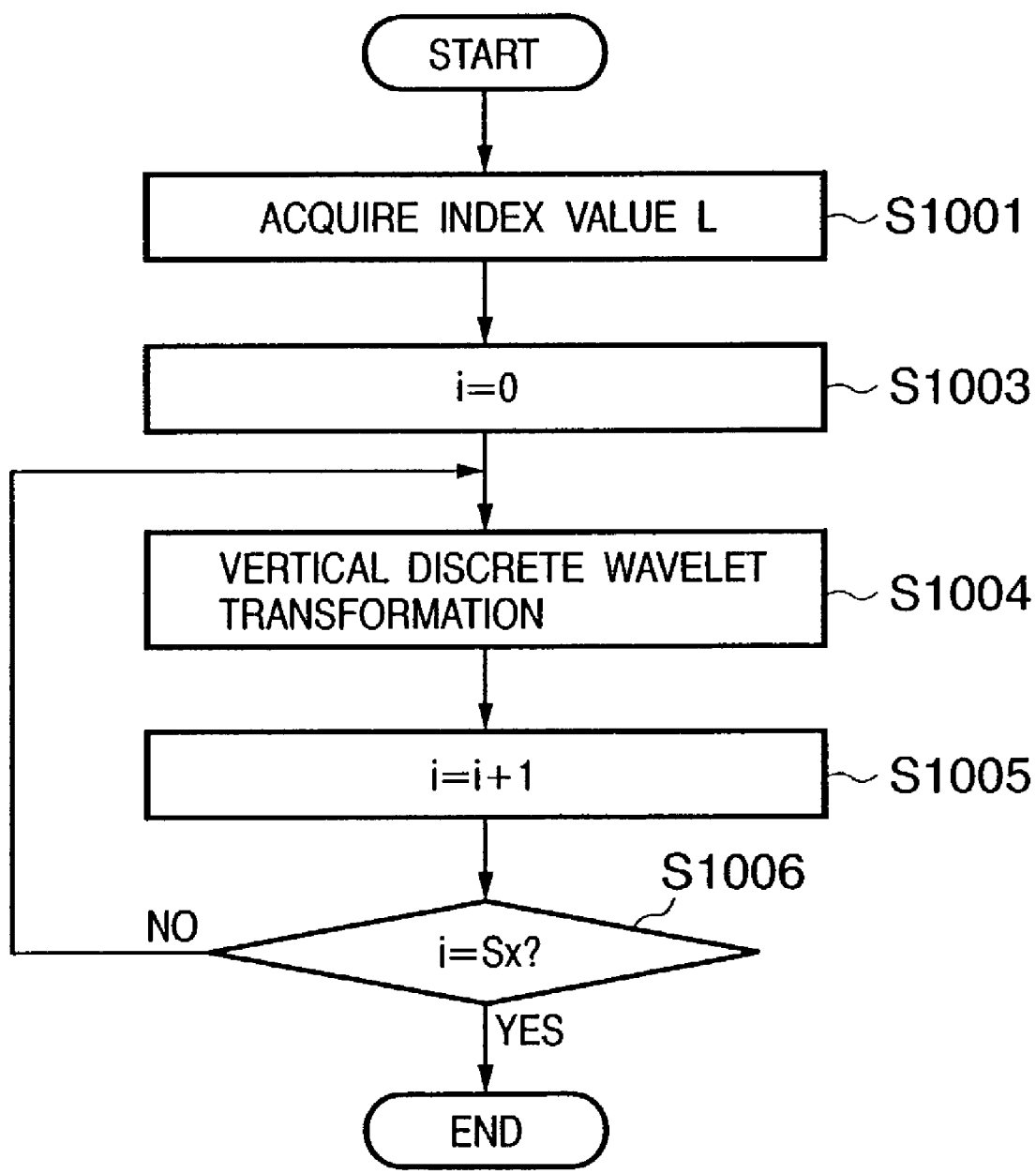
FIG. 9 is a flow chart of the transformation process in a vertical discrete wavelet transformer 803.

FIG. 9 is a flow chart showing the transformation process in the vertical discrete wavelet transformer 803. Referring to FIG. 9, step S1001 is the step of acquiring the index value L, step S1003 is the step of substituting zero in variable i, step S1004 is the step of executing a vertical discrete wavelet transformation process for one set of data to generate a coefficient of one low-frequency component and that of one high-frequency component, step S1005 is the step of incrementing variable i by 1, and step S1006 is the step of comparing variable i and the number Sx of samples in the horizontal direction.

The flow of processes in the vertical discrete wavelet transformer 803 will be explained below using FIG. 9. In step S1001, the index value L is read out from the signal storage processor 801. In step S1003, zero is substituted in variable i. In step S1004, the i-th column of sets of data which are stored in the buffer 802 and are continuous in the vertical direction is read out. The i-th column of sets of data which are continuous in the vertical direction is a sequence of data read out from six addresses i×6+mod(L,6), i×6+mod((L+1),6), i×6+mod((L+2),6), i×6+mod((L+3),6), i×6+mod((L+4),6), and i×6+mod((L+5),6), and the data read out from these addresses respectively correspond to $d'(n)$, $r''(n)$, $d''(n)$, $x(2n+2)$, $x(2n+3)$, and $x(2n+4)$ in the lifting steps given by equations (5) to (10).

Furthermore, in step S1004, a low-frequency component r[n] and high-frequency component d[n] are calculated based on equations (5) to (10), a coefficient r[n] of the low-frequency component is output onto the signal line 807, and a coefficient d[n] of the high-frequency component is output onto a signal line 808. At this time, the obtained intermediate value $d''(n+1)$ is stored at the address where $x(2n+3)$ is stored (i.e., i×6+mod((L+4),6)), the obtained intermediate value $r''(n+1)$ is stored at the address where $x(2n+2)$ is stored (i.e., i×6+mod((L+3),6)), and the obtained intermediate value $d'(n+1)$ is stored at the address where $d''(n)$ is stored (i.e., i×6+mod((L+2),6)). In step S1005, i is updated by adding 1 to it. In step S1006, i is compared with Sx. If i<Sx, the flow returns to step S1004. The processes in steps S1004 and S1005 (the process for computing the discrete wavelet transforms of a data set of the i-th column in the vertical direction while updating i) are repeated from i=0 to Sx−1.

The horizontal discrete wavelet transformers 805 and 806 execute transformation processes based on equations (5) to (10) for data for one line (coefficients of low- or high-frequency component) respectively input from the signal lines 807 and 808, and generate and output coefficients of low- and high-frequency components.

The aforementioned processes are repeated for all lines input from the signal input unit 800, thus computing the 2D discrete wavelet transforms of 2D signals.

With the aforementioned processes, efficient 2D discrete wavelet transformation that makes local memory access can be implemented.

Third Embodiment

Figure 10:
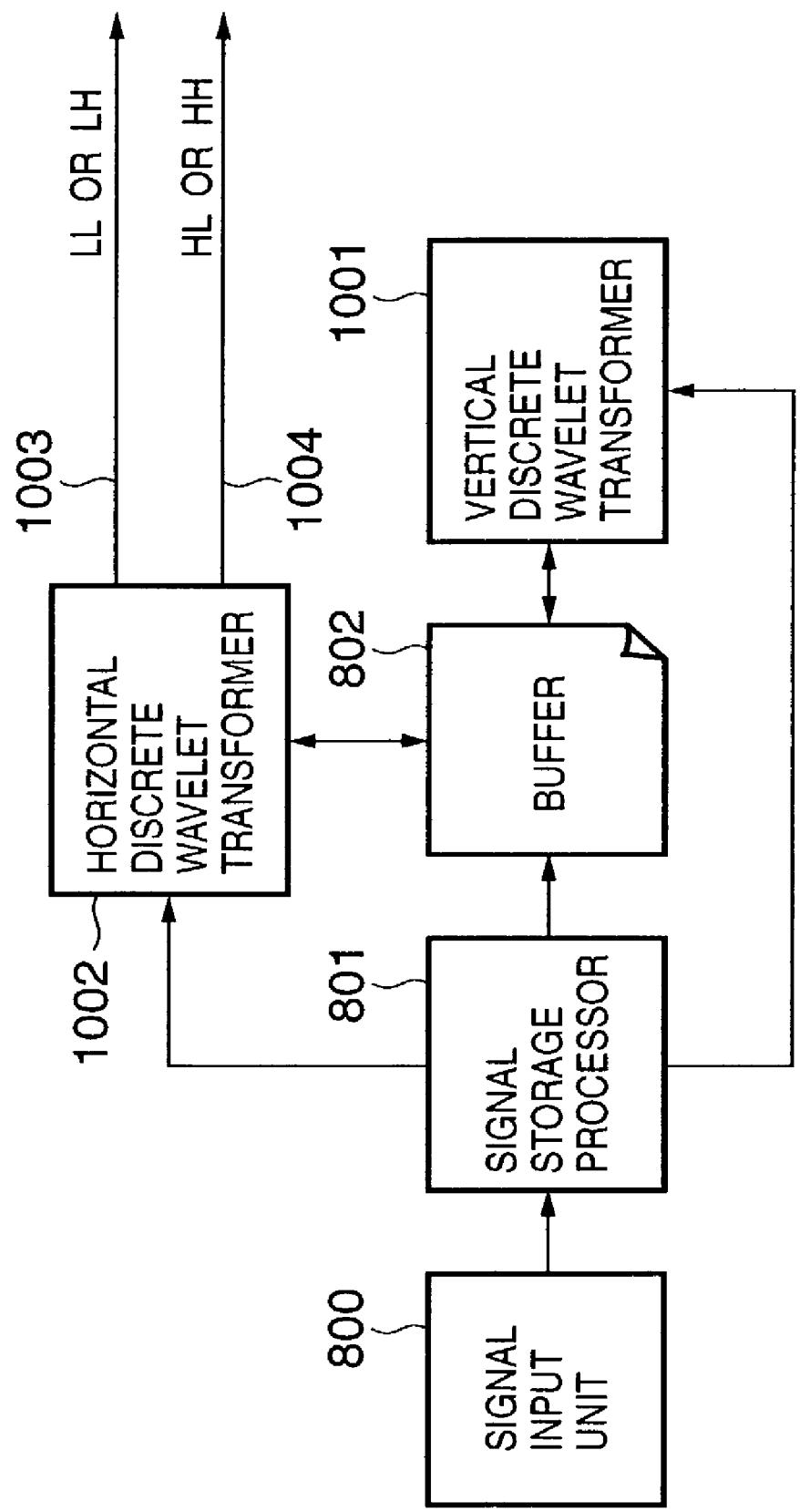
FIG. 10 is a block diagram showing the basic arrangement of a signal processing apparatus according to the third embodiment of the present invention.

FIG. 10 is a block diagram showing the basic arrangement of a signal processing apparatus of this embodiment. Referring to FIG. 10, reference numeral 800 denotes a signal input unit; 801, a signal storage processor; 1001, a vertical discrete wavelet transformer; 1002, a horizontal discrete wavelet transformer; and 1003 and 1004, signal lines. The same reference numerals in the third embodiment denote blocks which execute the same operations as in the second embodiment. The first and second embodiments comprise two horizontal discrete wavelet transformers, which respectively compute the discrete wavelet transforms of the coefficients of low- and high-frequency components output from the vertical discrete wavelet transformer in the horizontal direction. However, in the arrangement of this embodiment, only one horizontal discrete wavelet transformer is used.

The operation of the respective units of this embodiment will be described below using FIG. 10.

Assume that the signal processing apparatus of this embodiment computes the transforms of 2D signals which have X samples in the horizontal direction, and Y samples in the horizontal direction, and in which each sample (pixel) is expressed by 8 bits, as in the first and second embodiments described above. Also, Sx represents the number of samples in the horizontal direction of signals input to the signal processing apparatus of this embodiment. As the buffer 802, a capacity that can store data for six lines (6×Sx) is prepared, as in the second embodiment.

Two-dimensional (2D) signals to be transformed are input from the signal input unit 800 in the raster scan order. The signal storage processor 801 stores the signals input from the signal input unit 800 in the raster scan order in a buffer 802 for respective lines. The signal storage sequence of the signal storage processor 801 is as described in the second embodiment.

After required data are stored in the buffer 802, the vertical discrete wavelet transformer 803 computes the discrete wavelet transforms in the vertical direction to generate coefficients of low- and high-frequency components for one line, and outputs the coefficients of low-frequency components onto the signal line 807, and those of high-frequency components onto the signal line 808. Required data are stored in the buffer 802 at a timing when the index value L held by the signal storage processor 801 is updated to an even value, i.e., L is one of 2, 4, and 6.

The basic flow of processes in the vertical discrete wavelet transformer 1001 is substantially the same as that shown in FIG. 9, which shows the flow of processes of the vertical discrete wavelet transformer 803 in the second embodiment, except for step S1004. In step S1004, the i-th column of sets of data which are stored in the buffer 802 and are continuous in the vertical direction is read out. The i-th column of sets of data which are continuous in the vertical direction is a sequence of data read out from six addresses i×6+mod(L,6), i×6+mod((L+1),6), i×6+mod((L+2),6), i×6+mod((L+3),6), i×6+mod((L+4),6), and i×6+mod((L+5),6), and the data read out from these addresses respectively correspond to d'(n), r''(n), d''(n), x(2n+2), x(2n+3), and x(2n+4) in the lifting steps given by equations (5) to (10). Then, a low-frequency component r(n) and high-frequency component d(n) are calculated based on equations (5) to (10). At this time, the obtained intermediate value d''(n+1) is stored at the address where x(2n+3) is stored (i.e., i×6+mod((L+4),6)), the obtained intermediate value r''(n+1) is stored at the address where x(2n+2) is stored (i.e., i×6+mod((L+3),6)), and the obtained intermediate value d'(n+1) is stored at the address where d''(n) is stored (i.e., i×6+mod((L+2),6)). Also, d(n) is stored at the address where r''(n) is stored (i.e., i×6+mod((L+1),6)), and r(n) is stored at the address where d'(n) is stored (i.e., i×6+mod(L,6)). The processes in other steps are the same as those in FIG. 9.

The horizontal discrete wavelet transformer 1002 executes the transformation process based on equations (5) to (10) while considering r(n) for one line and d(n) for one line, which are calculated by the vertical discrete wavelet transformer 1001 and are stored in the buffer 802, as one-dimensional signals, thus generating and outputting coefficients of low- and high-frequency components.

The aforementioned processes are repeated for all lines input from the signal input unit 800, thus computing the 2D discrete wavelet transforms.

With the above processes, efficient 2D discrete wavelet transformation that can reduce the required memory size and makes local memory access can be implemented.

Fourth Embodiment

Figure 13:
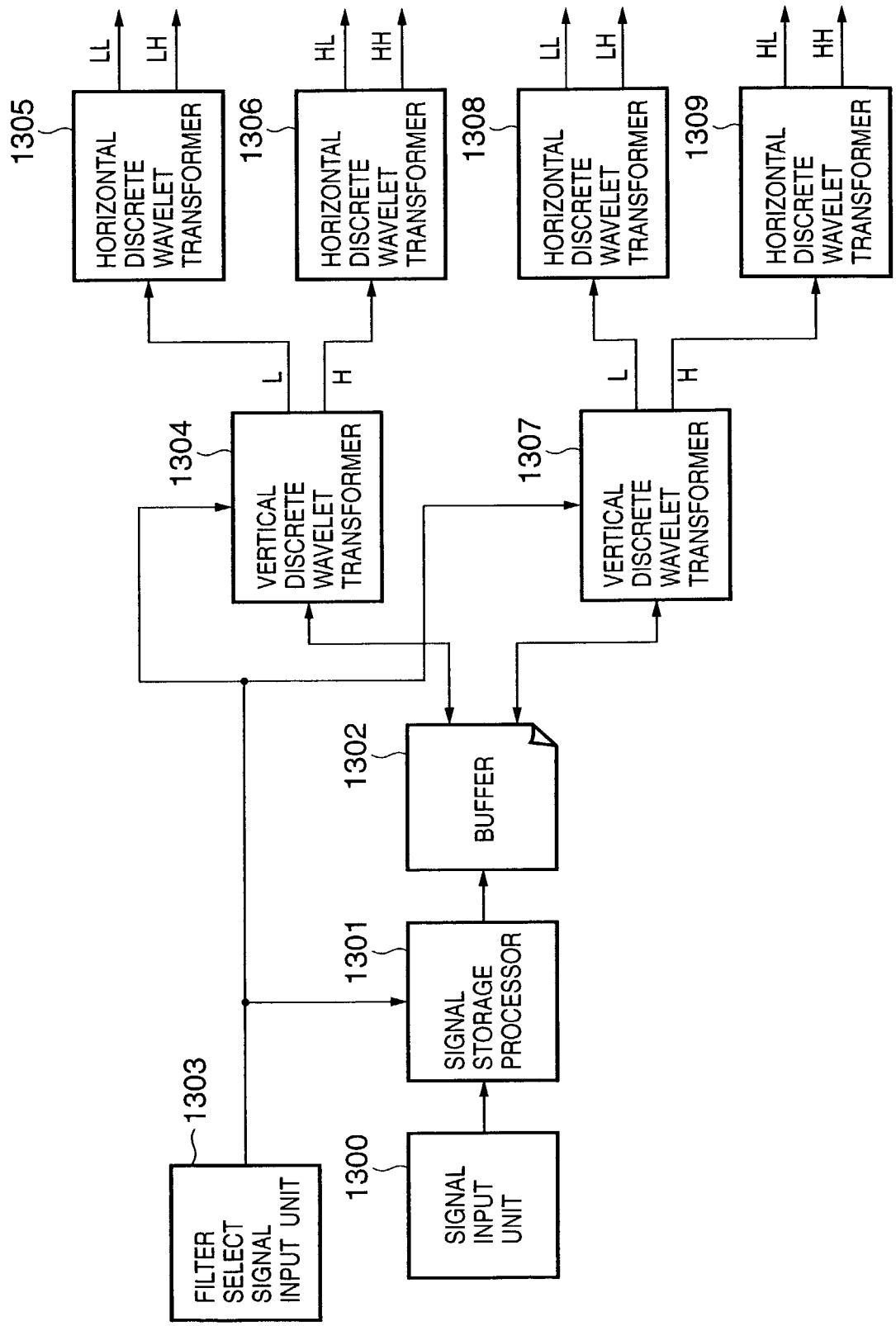
FIG. 13 is a block diagram showing the basic arrangement of a signal processing apparatus according to the fourth embodiment of the present invention.

FIG. 13 is a block diagram showing the basic arrangement of a signal processing apparatus of this embodiment. Referring to FIG. 13, reference numeral 1300 denotes a signal input unit; 1301, a signal storage processor; 1302, a buffer; 1303, a filter select signal input unit; 1304, a vertical discrete wavelet transformer; 1305 and 1306, horizontal discrete wavelet transformers; 1307, a vertical discrete wavelet transformer; and 1308 and 1309, horizontal discrete wavelet transformers.

Assume that the signal processing apparatus of this embodiment computes the transforms of 2D signals which have X samples in the horizontal direction, and Y samples in the horizontal direction, and in which each sample (pixel) is expressed by 8 bits, as in the first to third embodiments described above. Also, Sx represents the number of samples in the horizontal direction of signals input to the signal processing apparatus of this embodiment. As the buffer 1302, a capacity that can store data for six lines (6×Sx) is prepared, as described in the second embodiment.

The operation of the signal processing apparatus of this embodiment will be described below using FIG. 13.

Prior to input of 2D signals to be transformed from the signal input unit 1300, the filter select signal input unit 1303 inputs a filter select signal F that designates a discrete wavelet transformation scheme. The signal processing apparatus of this embodiment implements 2D discrete wavelet transformation using a reversible 5×3 filter using the vertical discrete wavelet transformer 1304 and horizontal discrete wavelet transformers 1305 and 1306 when the filter select signal F is "0", and implements 2D discrete wavelet transformation using an irreversible 9×7 filter using the vertical discrete wavelet transformer 1307 and horizontal discrete wavelet transformers 1308 and 1309 when the filter select signal F is "1". As the 5×3 filter, the first embodiment uses the filter given by equations (3) and (4), but this embodiment uses a filter given by:

$$r(n)=x(2n)+\text{floor}\{(d(n-1)+d(n)+2)/4\} \quad (11)$$

$$d(n)=x(2n+1)-\text{floor}\{(x(2n)+x(2n+2))/2\} \quad (12)$$

where floor{R} indicates a maximum integer smaller than real number R so as to implement reversible discrete wavelet transformation that can perfectly reconstruct an original signal. As the 9×7 filter, the same filter as the 9×7 filter explained in the second embodiment is used.

After the filter select signal is input from the filter select signal input unit 1303, 2D signals to be transformed are input from the signal input unit 1300 in the raster scan order. As in the conventional method and the first to third embodiments described above, assume that extension of signals by reflecting them at their two ends in the horizontal and vertical directions is done outside the apparatus and is not taken into consideration.

Figure 14:
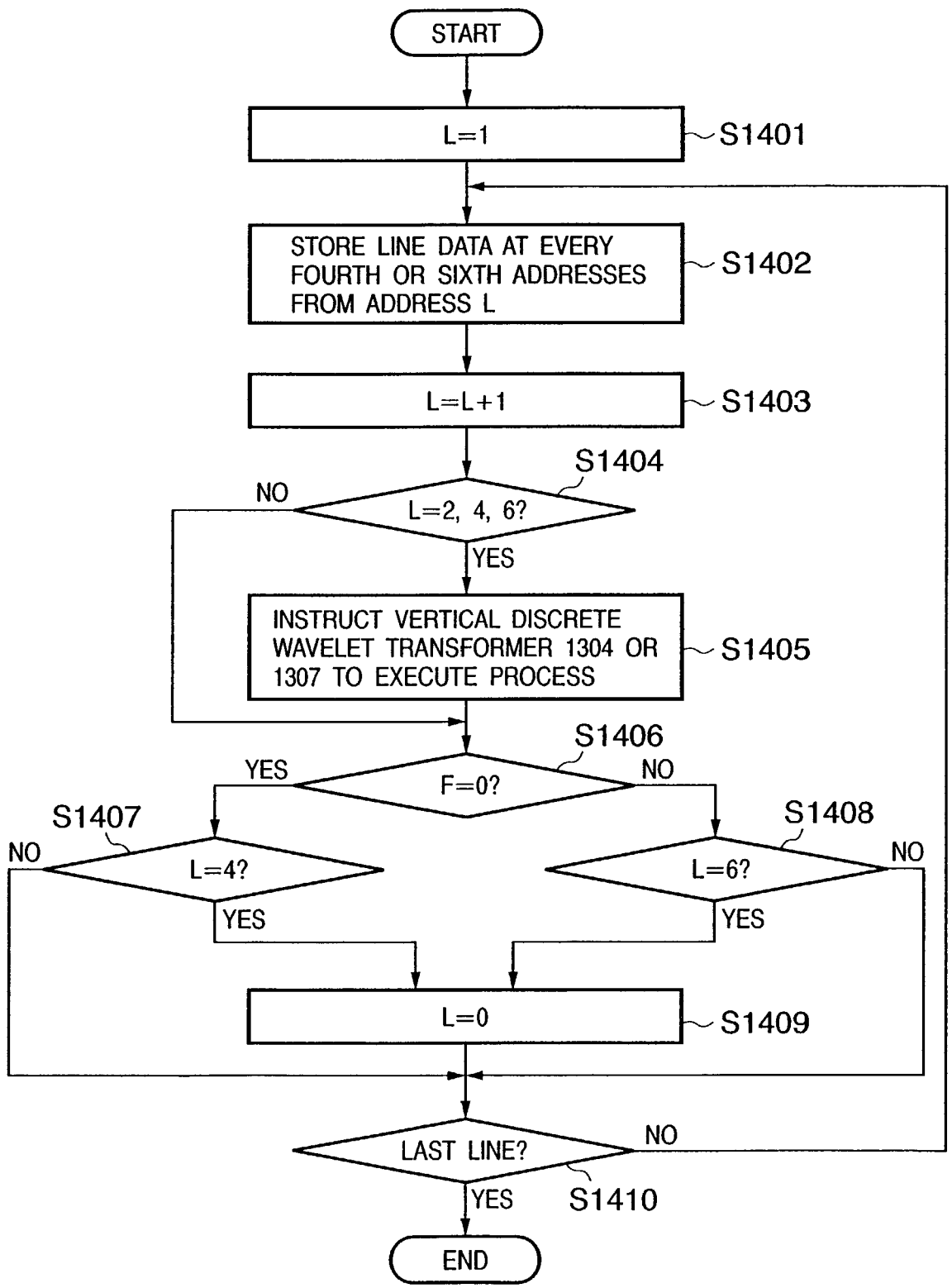
FIG. 14 is a flow chart showing the flow of processes of a signal storage processor 1301.

The signal storage processor 1301 stores the signals input from the signal input unit 1300 in the raster scan order in the buffer 1302 for respective lines. FIG. 14 shows the flow of processes in the signal storage processor 1301. Referring to FIG. 14, step S1401 is the step of initializing an index value L to 1, step S1402 is the step of storing line data, step S1403 is the step of updating the index value L, steps S1404 and S1405 are the steps of instructing the vertical discrete wavelet transformer 1304 or 1307 to compute the discrete wavelet transforms in the vertical direction if the index value L is 2, 4 or 6, steps S1406, S1407, S1408, and S1409 are the steps of replacing the index value L by zero if it has exceeded a predetermined value, and step S1410 is the step of checking if the line of interest is the last line.

At the beginning of the transformation process, index L is initialized to 1 (step S1401). Signals for one line, which are input from the signal input unit 1300, are stored at every fourth or sixth addresses in turn from address L of the buffer 1302 (step S1402). The signal allocation spacing is determined by the filter select signal F input from the filter select signal input unit 1303. That is, if the filter select signal F is "0", signals are stored at every fourth addresses; if the filter select signal F is "1", signals are stored at every sixth addresses. Upon completion of storage of signals for one line, index L is incremented by 1 to update the index (step S1403). If index L is 2, 4, or 6 (step S1404), the processor 1301 instructs the vertical discrete wavelet transformer 1304 or 1307 to compute the discrete wavelet transforms in the vertical direction (step S1405). If the filter select signal F is "0", i.e., if 2D discrete wavelet transformation is to be executed using the reversible 5×3 filter, an instruction is issued to the vertical discrete wavelet transformer 1304; if the filter select signal F is "1", i.e., if 2D discrete wavelet transformation is to be executed using the irreversible 9×7 filter, an instruction is issued to the vertical discrete wavelet transformer 1307. If the filter select signal is "0", and if index L has reached 4, index L is re-set to zero (steps S1406, S1407, and S1409). On the other hand, if the filter select signal is "0", and if index L has reached 6, index L is re-set to zero (steps S1406, S1408, and S1409). It is checked if the signals for one line stored in the buffer 1302 correspond to the last line of 2D signals to be transformed (step S1410). If NO in step S1410, the process is repeated from step S1402; otherwise, the process ends.

If the filter select signal F is "0", i.e., if 2D discrete wavelet transformation using the reversible 5×3 filter is selected, the vertical discrete wavelet transformer 1304 computes the discrete wavelet transforms in the vertical direction to generate coefficients of low- and high-frequency components for one line, after required data are stored in the buffer 1302, and outputs them to the horizontal discrete wavelet transformers 1305 and 1306. Required data are stored in the buffer 1302 at a timing when the index value L held by the signal storage processor 1301 is updated to an even value, i.e., L is updated to one of 2 and 4. When the reversible 5×3 filter is selected, if the index value L is updated to 4, it is immediately re-set to zero. Hence, a practical range the index value L can assume ranges from 0 to 3. The flow of transformation processes in the vertical discrete wavelet transformer 1304 is substantially the same as that in the vertical discrete wavelet transformer 103 described in the first embodiment, except that this transformer operates only when the filter select signal F is "0", and the filter applied to the transformation processes is given by equations (11) and (12).

The horizontal discrete wavelet transformers 1305 and 1306 execute transformation processes based on equations (11) and (12) for data for one line (coefficients of low- or high-frequency component) input from the vertical discrete wavelet transformer 1304, and generate and output coefficients of low- and high-frequency components.

On the other hand, if the filter select signal F is "1", i.e., if 2D discrete wavelet transformation using the irreversible 9×7 filter is selected, the vertical discrete wavelet transformer 1307 computes the discrete wavelet transforms in the vertical direction to generate coefficients of low- and high-frequency components for one line, after required data are stored in the buffer 1302, and outputs them to the horizontal discrete wavelet transformers 1308 and 1309. Required data are stored in the buffer 1302 at a timing when the index value L held by the signal storage processor 1301 is updated to an even value, i.e., L is updated to one of 2, 4, and 6. The flow of transformation processes in the vertical discrete wavelet transformer 1307 is substantially the same as that in the vertical discrete wavelet transformer 803 described in the second embodiment, except that this transformer operates only when the filter select signal F is "1".

The horizontal discrete wavelet transformers 1308 and 1309 execute transformation processes based on equations (5) to (10) for data for one line (coefficients of low- or high-frequency component) input from the vertical discrete wavelet transformer 1307, and generate and output coefficients of low- and high-frequency components.

The aforementioned processes are repeated for all lines input from the signal input unit 1300, thus computing the 2D discrete wavelet transforms of 2D signals.

With the aforementioned processes, efficient 2D discrete wavelet transformation that makes local memory access can be implemented. Furthermore, in this embodiment, a plurality of filters can be selectively used.

In the aforementioned embodiments, the discrete wavelet transformation processes using the 5×3 and 9×7 filters have been explained. However, the discrete wavelet transformation scheme is not limited to those described in the above embodiments, and other filter types (e.g., 2×10 filter, 2×6 filter, and the like) may be used. In the above embodiments, an identical filter is applied in the horizontal and vertical directions, but different filters may be applied in the horizontal and vertical directions.

In the above embodiments, the discrete wavelet transformation processes are done in the order of the vertical and horizontal directions. However, the present invention is not limited to such specific order, and a reverse order may be used.

In the aforementioned embodiments, a fixed memory area is assigned to samples (column sample) in the vertical direction. Alternatively, memory assignment for each column sample may be changed for respective lines.

OTHER EMBODIMENTS

Furthermore, the invention is not limited only to the device and method for realizing the embodiments above, but a case also falls within the scope of the invention where a program code for software to realize the embodiments above is provided to a computer (CPU or MPU) in a system or device, and the computer of the system or device causes the various devices to operate in accordance with the program code so that the embodiments can be realized.

In this case, the program code itself for software will realize the features of the embodiments, thus the program code itself and the means for supplying the code to a computer, specifically, a storage medium with the program code stored on it, are included within the scope of the invention.

The storage medium for storing such a program code may include floppy® disk, hard disk, optical disk, magneto-optical disk, CD-ROM, magnetic tape, non-volatile memory card, ROM and so on.

In addition, such a program code is included within the scope of the invention not only in the case where a computer controls various devices only in accordance with supplied program code to realize the features of the embodiments, but also in the case where the program code realizes the embodiments in conjunction with an OS (operating system) or other application software running on a computer.

Also, a case is included within the scope of the invention where after the supplied program code has been stored in memory provided on a feature expansion board of a computer or a feature expansion unit connected to a computer, the CPU or the like on the feature expansion board or unit executes some or all of the actual processing based on the designation of the code to realize the embodiments.

As described above, according to the present invention, the time required to read out data to be accessed by wavelet transformation can be reduced, and high-speed wavelet transformation can be implemented.

What is claimed is:

1. A signal processing apparatus comprising:
   storage control means for controlling to store image signals for a predetermined number of lines in predetermined storage means, and counting an index value for each line upon storing an image signal for each line in the storage means;
   first wavelet transformation means for specifying addresses in the storage means of data at identical positions in respective lines stored in the storage means using the index value in response to a timing at which the index value reaches a predetermined value, and reading out data stored at the specified addresses, and applying a wavelet transforms to the data in a first direction; and
   second wavelet transformation means for applying a wavelet transforms to coefficients obtained by said first wavelet transformation means in a second direction.

2. The apparatus according to claim 1, wherein said storage control means stores image signals for the predetermined number of lines in the storage means for respective lines.

3. The apparatus according to claim 1, wherein said storage control means stores data at identical positions in respective lines of the image signals in the storage means together.

4. The apparatus according to claim 1, wherein the predetermined number of lines is determined in accordance with a size of a filter used by said first and second wavelet transformation means.

5. The apparatus according to claim 4, wherein when the filter used by said first and second wavelet transformation means is a 5×3 filter, the storage means stores data for four lines as the predetermined number of lines.

6. The apparatus according to claim 4, wherein when the filter used by said first and second wavelet transformation means is a 9×7 filter, the storage means stores data for six lines as the predetermined number of lines.

7. The apparatus according to claim 1, wherein said first wavelet transformation means specifies addresses in the storage means of data at identical positions in respective lines stored in the storage means using a reference address corresponding to the index value in response to the timing at which the index value reaches the predetermined value.

8. The apparatus according to claim 7, wherein when the storage means stores data for four lines,
   when the index value is 2, the reference address is 2, when the index value is 4, the reference address is zero, and the predetermined value is 2.

9. The apparatus according to claim 8, wherein when said first wavelet transformation means reads out i-th data of respective lines of the data of respective lines stored in the storage means, if B represents the reference address, said first wavelet transformation means reads out data stored at four addresses calculated by:

i×4+B, i×4+mod((B+1),4), i×4+mod((B+2),4), and i×4+mod((B+3),4), and stores a high-frequency component of coefficients obtained by applying the wavelet transforms to the readout data at the address i×4+mod((B+3),4) in the storage means.

10. The apparatus according to claim 1, wherein when the storage means stores data for six lines, the predetermined value is one of 2, 4, and 6.

11. The apparatus according to claim 10, wherein when said first wavelet transformation means reads out i-th data of respective lines of the data of respective lines stored in the storage means, if L represents the index value, said first wavelet transformation means reads out data stored at six addresses calculated by:

i×6+mod(L,6), i×6+mod ((L+1),6), i×6+mod((L+2),6), i×6+mod((L+3),6), i×6+mod((L+4),6), and i×6+mod((L+5),6).

12. The apparatus according to claim 1, wherein the first and second directions are respectively vertical and horizontal directions with respect to an image.

13. A signal processing method comprising:
   a storage control step of controlling to store image signals for a predetermined number of lines in predetermined storage means, and counting an index value for each line upon storing an image signal for each line in the storage means;
   a first wavelet transformation step of specifying addresses in the storage means of data at identical positions in respective lines stored in the storage means using the index value in response to a timing at which the index value reaches a predetermined value, and reading out data stored at the specified addresses, and applying a wavelet transforms to the data in a first direction; and a second wavelet transformation step of applying a wavelet transforms to coefficients obtained in the first wavelet transformation step in a second direction.

14. A program stored in a computer readable medium for making a computer implement a signal processing method of claim 13.

15. A computer-readable storage medium storing a program of claim 14.

16. A signal processing apparatus for decomposing two-dimensional signals into frequency bands, comprising:

signal input means for inputting two-dimensional signals to be transformed;

first wavelet transformation means for applying a wavelet transforms to the two-dimensional signals input by said signal input means in a first direction to generate coefficients of low- and high-frequency bands;

second wavelet transformation means for applying a wavelet transforms to the coefficients generated by said first wavelet transformation means in a second direction different from the first direction; and signal storage means for storing two-dimensional signals, or two-dimensional signals and intermediate signals, which are required in transformation in a vertical direction, for a predetermined number of lines, wherein one of said first and second wavelet transformation means reads out the signals stored in said signal storage means, and applies a wavelet transforms to the signals in the vertical direction, and said signal storage means independently assigns a memory area to each column sample used in wavelet transformation in the vertical direction.

17. The apparatus according to claim 16, wherein the predetermined number of lines is determined in accordance with a size of a filter used by one of said first and second wavelet transformation means, which is applied in the vertical direction.

18. The apparatus according to claim 16, wherein a size of the memory area assigned to each column sample is determined in accordance with a size of a filter used by one of said first and second wavelet transformation means, which is applied in the vertical direction.

19. The apparatus according to claim 16, wherein a filter used by said first and second wavelet transformation means is a 5×3 filter, and a size of the memory area assigned to each column sample is not less than four samples.

20. The apparatus according to claim 16, wherein a filter used by said first and second wavelet transformation means is a 9×7 filter, and a size of the memory area assigned to each column sample is not less than six samples.

21. The apparatus according to claim 16, further comprising filter selection means for selecting a filter used by said first and second wavelet transformation means, and wherein a method of assigning the memory area to each column sample in said signal storage means is changed in accordance with the filter.

22. The apparatus according to claim 21, wherein said filter selection means can select one of 5×3 and 9×7 filters.

23. The apparatus according to claim 22, wherein when said signal storage means stores data for four lines, when the index value is zero, the reference address is 2, when the index value is 2, the reference address is zero, and the predetermined value is 2.

24. A signal processing method for decomposing two-dimensional signals into frequency bands, comprising:

a signal input step of inputting two-dimensional signals to be transformed;

a first wavelet transformation step of applying a wavelet transforms to the two-dimensional signals input in the signal input step in a first direction to generate coefficients of low- and high-frequency bands;

a second wavelet transformation step of applying a wavelet transforms to the coefficients generated in the first wavelet transformation step in a second direction different from the first direction; and a signal storage step of storing two-dimensional signals, or two-dimensional signals and intermediate signals, which are required in transformation in a vertical direction, for a predetermined number of lines, wherein the signals stored in the signal storage step are read out in one of the first and second wavelet transformation steps, and applied a wavelet transforms in the vertical direction, and the signal storage step includes a step of independently assigning a memory area to each column sample used in wavelet transformation in the vertical direction.

25. A program stored in a computer readable medium for making a computer implement a signal processing method of claim 24.

26. A computer-readable storage medium storing a program of claim 25.

* * * * *